Patented Sept. 8, 1953

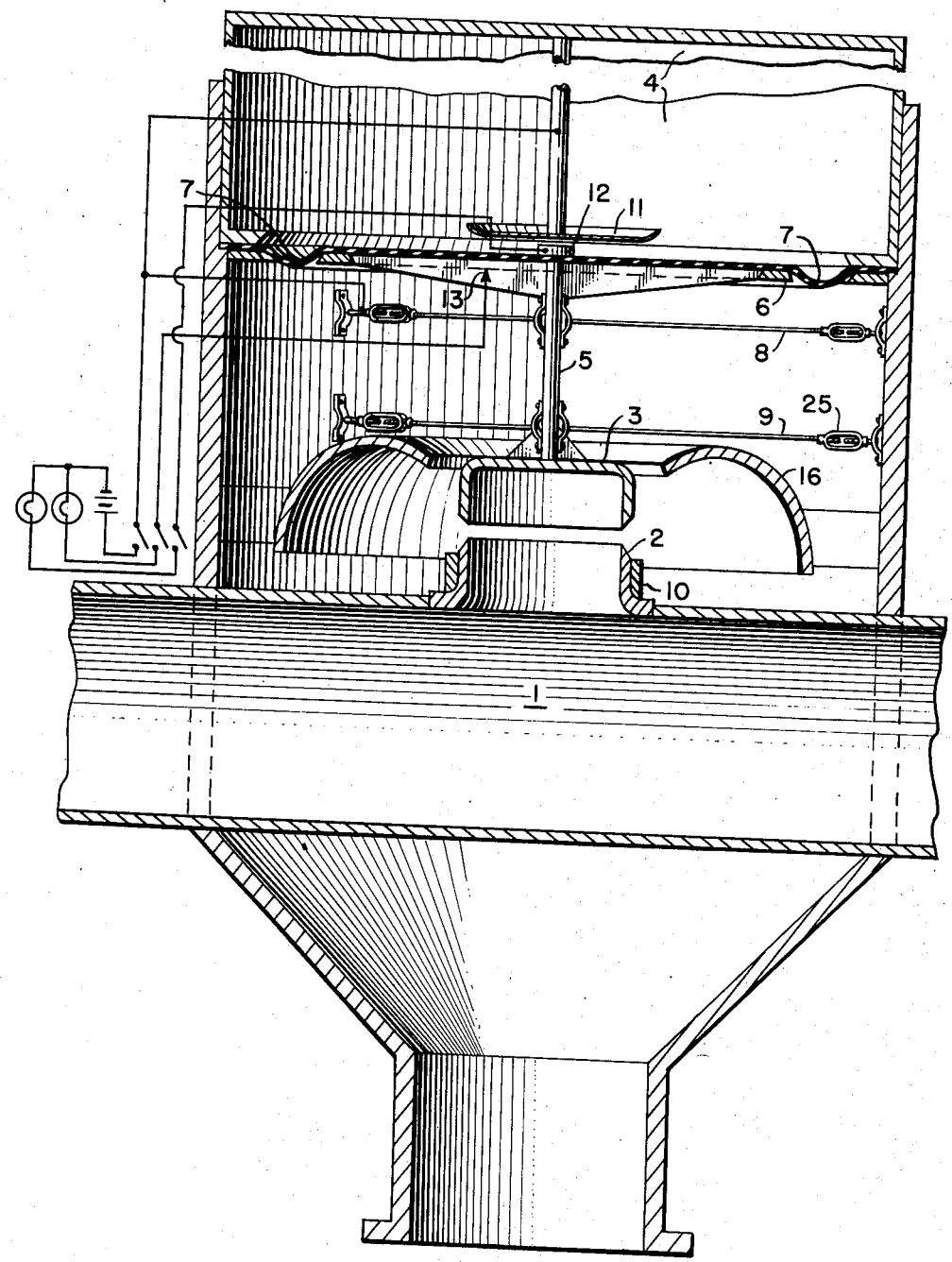
INVENTOR
PAUL ANGLES D'AURIAC
BY George N. Corey
ATTORNEY

2,651,323

UNITED STATES PATENT OFFICE 2,651,323

PRESSURE REGULATOR

Paul Angles d'Auriac, Grenoble, France, assignor to Ateliers Neyret-Beylier & Piccard-Pictet, Grenoble, France, a corporation of the Republic of France Application February 5, 1948, Serial No. 6,440
In France November 15, 1945

Section 1, Public Law 690, August 8, 1946
Patent expires November 15, 1965

7 Claims. (Cl. 137—528)

The object of the present invention is a pressure regulator applicable to pipe lines or to liquid or gas containers under high pressure, especially when it is necessary to obtain a very great accuracy and a very fast adjustment. The invention relates to that type of pressure relief valves, in which the discharge delivery acts on the valve which regulates it, in such a way as to compensate the variations in pressure. This type of valve has already been applied successfully with the object of regulating pressure in low pressure air pipe lines, but it has not been possible to apply them to hydraulic pipe lines or to high pressure gases, because of the wide variations in pressure. As a rule, it is impossible in such cases to reduce the friction, inertia and inherent pressure droop in these devices to such a low value as to obtain accurate operation. It is possible, of course, to build so called "safety valves" which open automatically above a given pressure but the accuracy of such devices is only 10 to 20%.

The pressure regulator constructed in accordance with the present invention includes a valve of suitable dimensions, aligned with an orifice and subject to the action of a jet issuing therefrom under the effect of the pressure to be regulated. The valve can travel in the direction of the jet whose action is counterbalanced by a "pneumatic spring" including a large gas-filled container. The container is sealed by a movable wall fastened to the valve. Air tightness between the movable wall and the container is secured by means of a flexible and gasproof diaphragm.

The moving parts, which are preferably mounted for vertical movement, are guided by a system having as little resistance to motion as possible, for instance, by substantially inextensible wires attached at one end to the valve stem and at the opposite ends to a fixed support. These wires extend perpendicular to the direction of motion of the valve and are maintained under tension.

The use as a spring of a very low inertia gas enables the inertia of the moving parts to be reduced to a mere fraction as compared to its corresponding value if metallic springs were used. If metallic springs were used they would require very great dimensions and mass in order to have sufficient resistance without appreciable droop. Furthermore, resistance to motion is minimized due to the negligible stresses which are necessary to strain the wires and diaphragm.

Therefore the invention has the advantage of enabling very fast variations in pressure to be compensated, without allowing the pressure to rise beyond the permissible limits.

But the invention is not restricted to the use of wires as a guiding system especially when the valves are large ones. Different devices with low resistance to motion can be suggested, for instance, devices combining rotary and sliding motion, the stem of the valve then being of the sliding kind and actuated by a rotary movement.

Other systems would be of the rolling friction type by means of roller chains, etc.

In order that the invention may be more readily understood, an embodiment thereof is described herein with reference to the accompanying drawing.

Container 1 contains a fluid whose pressure is to be maintained substantially constant. A nozzle 2 is located in an aperture in the container 1 and aligned with the nozzle 2 is a valve 3. It will be assumed that the velocity of approach within the container 1 is negligible as compared to the velocity of the fluid in the nozzle.

This embodiment shows a valve of a particular type, comprising a portion of a hollow cylinder. This type of valve is characterized by the fact that the jet exerts thereon a force which is strictly constant as long as the pressure is constant, and which does not vary with the valve opening or the rate of flow. If a constant opposing force is exerted on the valve, the pressure is held to a constant value, since as soon as it tends to vary the equilibrium is destroyed and the discharge delivery varies until a new state of equilibrium has been attained, and this can only take place when the constant pressure has been restored, as the opposing force exerted on the valve is constant. The droop in regulating is accordingly nil. As long as the pressure is constant, the valve is stationary. If it departs from its position of equilibrium, as a result for instance of a variation in the momentary pressure which is immediately cancelled, its delivery varies, the pressure inside the container also varies accordingly and the constant opposing force, which is no longer counterbalanced, tends to return the valve to its initial position.

Certain practical applications of this kind of valve use a weight as a constant biasing force. This weight's inertia however is much too great to allow it to follow rapid variations in pressure. According to the invention a pneumatic spring is used to supply the biasing force. Since gases have very low inertia, the pneumatic spring can readily follow rapid pressure changes. The invention includes a gas container of sufficient size so that the variations in the pressure of the gas brought about by the movement of the valve are negligible. In order to improve the power of response of the device, it may be of some advantage to obtain a certain droop. This droop is an inverse function of the dimensions of the container. It is possible, for example, to provide droop equal to the maximum variations in the liquid pressure to be allowed when the regulating device is in action. The value of regulation of the pressure of liquid depends, therefore, upon the pressure of the gas in the container. The gas pressure in the container is therefore established at a mean value, corresponding to a mean valve position. The container pressure varies slightly from this mean value as the valve moves from its mean position.

It is possible to use a valve head having a different shape than that shown in the drawing, for example a circular disc. It is known that for a certain diameter of disc the force exerted by the jet on such a disc varies very little with the distance between the orifice and the disc. A slight droop is then obtained, which can be practically balanced by reducing the dimensions of the air container so as to obtain an equal and opposite variation of the biasing force with the valve travel.

In the embodiment described herein by way of example the container 4 is a simple metallic cylinder. The valve comprises a stem 5 which carries a circular disc 6 having a smaller diameter than that of the container 4. On this disc rests a rubber diaphragm 7, which has its peripheral edge clamped tightly between two circular flanges which form part of the container. In this way tight closure of the container is secured by the rubber diaphragm, but almost all of the force due to the pressure within the container is opposed by the disc 6. This diaphragm is not necessarily made out of rubber, nor even very resilient; it must only be very flexible and allow sufficient clearance to the disc. In any case resistance to motion is extremely small, whilst the tight closure can be perfect, which would have proved impossible to accomplish in connection with a piston sliding in a cylinder. On the other hand, with an elastic diaphragm, the strain alone would have produced variation of the counterbalancing force.

Disc 6 can be made very light by perforating its surface, the diaphragm securing complete airtightness. Its surface can therefore be reduced to ribs sufficiently close to one another to avoid excessive stresses on the diaphragm.

Because of the limited resistance of the diaphragm, a low pressure within the container 4 is desirable. A disc is selected which is sufficiently large to provide the required biasing force with the low container pressure available.

The guiding system for the movement of the valve must have a minimum of friction. Different systems may be considered. In the drawing the stem 5 is held by two series of three practically inextensible flexible wires 8 and 9, these wires being stretched perpendicularly to the rod and arranged at 120° in relation to one another. Their tension is adjustable, which enables the valve to be exactly centered. A mechanism for adjusting the tension is shown diagrammatically at 25 in the drawing. Any suitable tension adjusting means may be used, for example, a turn-buckle. The movements of the valve are of sufficiently small amplitude that they take place without substantially stressing the wires 8 and 9, and hence practically without resistance. It is also possible to have four wires arranged at 90°, or even more.

Of course any other arrangement of the valve would be equally convenient, provided that very little friction is involved. It would be possible, for example, to use a ball race.

For the purpose of ensuring exact centering of the valve the following system may be used. Nozzle 2 and valve 3 are machined to the same outer diameter, and a ring 10 is slidably mounted on the nozzle. If the valve is exactly centered, the ring will be able to pass from the nozzle on to the valve without difficulty.

To avoid damage to the diaphragm it is desirable to limit the movements of the valve. In the drawing, movement of the valve towards the container is limited by the contact of the valve itself with its seat. A plate 11 secured to the walls of the reservoir 4 forms an abutment which limits upward valve movement.

Electrical contacts 12 and 13 are provided to complete a circuit when the valve reaches the end of its movement. They can actuate signals, or even control a pressure adjusting servo-motor. It can be proved that the more sensitive the valve is the smaller is its scale of regulation. It is necessary, therefore, in addition to its accurate hydrodynamic and automatic regulation, to provide a manual or automatic approximative regulation, preferably disengaged by the contacts 12 and 13.

In those cases in which turbulence, eddies, or other undesirable velocity distribution within the fluid tends to produce in the nozzle a pressure different from that existing within the fluid, it is desirable to provide a pipe conducting the fluid to the valve. The shape and dimensions of the pipe enable the detrimental currents to be reduced. This arrangement offers advantage, for example, when the adjacent wall of the container 1, is not horizontal, because the valve according to the invention preferably operates vertically. Finally, a baffle 16 can be arranged in such a way as to guide the fluid as it issues from the valve.

To improve the characteristics of this jet, and therefore, the operation of the valve, it is desirable to machine the discharge edges of nozzle 2 and valve 3 to a very sharp and sufficiently acute angle, so that the circular jet separates neatly without break along conical frusta flush with the inner and outer surfaces of the walls.

The invention is in no way restricted to the forms of embodiment described. On the contrary it involves all equivalent alterations insofar as they relate more particularly to the shape of the head of the valve, the arrangement of the moving device, and that of the gas proof diaphragm.

What I claim is:

1. A valve for regulating the pressure of a fluid in a container at a substantially constant value, comprising a cylindrical nozzle in fluid communication with said container to discharge fluid therefrom, a movable cup-shaped cylindrical obturator aligned with said nozzle in the path of a jet of fluid issuing from said nozzle, said nozzle and obturator having the same external diameter, means defining a closed chamber aligned with said obturator, said chamber defining means including a flexible diaphragm adjacent said obturator, and a stem connecting said diaphragm and said obturator, said chamber being completely filled with a gas at a pressure greater than the pressure of the fluid on the outside of said diaphragm so that the force acting on the diaphragm due to the difference between said pressures balances the force acting on the obturator due to the pressure of the fluid in said container when said last-mentioned pressure is at said substantially constant value determined by the diaphragm area, the obturator area, and said pressure difference, said chamber having a large volume so that movement of the diaphragm causes only slight variations in the pressure in said chamber, the pressure in said chamber being substantially the only biasing force opposing opening movement of the obturator by the jet, means guiding said obturator for movement toward and away from the nozzle, and a ring encircling said nozzle and slidable thereon toward said obturator to check the concentricity of the nozzle and obturator.

2. A valve for regulating the pressure of a fluid in a container at a substantially constant value, comprising a cylindrical nozzle in fluid communication with said container to discharge fluid therefrom, a movable obturator aligned with said orifice in the path of a jet of fluid issuing from said orifice, means defining a closed chamber aligned with said obturator, said chamber defining means including a flexible diaphragm adjacent said obturator, a stem connecting said diaphragm and said obturator, said chamber being completely filled with a gas at a pressure greater than the pressure of the fluid on the outside of said diaphragm so that the force acting on the diaphragm due to the difference between said pressures balances the force acting on the obturator due to the pressure of the fluid in said container when said last-mentioned pressure is at said substantially constant value, determined by the diaphragm area, the obturator area, and said pressure difference, said chamber having a large volume so that movement of the diaphragm causes only slight variations in the pressure in said chamber, the pressure in said chamber being substantially the only biasing force opposing opening movement of the obturator by the jet, and a stationary annular baffle concentric with the obturator and spaced laterally therefrom and curved to guide the fluid issuing from the valve in a direction away from the diaphragm.

3. A valve for regulating the pressure of a fluid in a container at a substantially constant value, comprising means defining a discharge orifice in fluid communication with said container to discharge fluid therefrom, a movable obturator aligned with said orifice in the path of a jet of fluid issuing from said orifice, low inertia means biasing said obturator toward said orifice, said biasing means including means defining a closed chamber aligned with said obturator, said chamber defining means including a flexible diaphragm adjacent said obturator, a stem connecting said diaphragm and said obturator, said chamber being completely filled with a gas at a pressure greater than the pressure of the fluid on the outside of said diaphragm so that the force acting on the diaphragm due to the difference between said pressures balances the force acting on the obturator due to the pressure of the fluid in said container when said last-mentioned pressure is at said substantially constant value determined by the diaphragm area, the obturator area, and said pressure difference, said chamber having a large volume so that movement of the diaphragm causes only slight variations in the pressure in said chamber, the pressure in said chamber providing substantially the only biasing force opposing opening movement of the obturator by the jet, and substantially frictionless means guiding said obturator toward and away from said orifice.

4. A pressure regulating valve as defined in claim 3, including stop means effective to limit the range of movement of said obturator toward and away from said orifice to a small distance and thereby to limit the range of variation of pressure in said chamber.

5. A pressure regulating valve as defined in claim 3, in which said frictionless guide means is radially adjustable to vary the centering of said obturator with respect to the orifice; said obturator and said orifice defining means are cylindrical and of equal external diameter; and including a ring encircling said orifice defining means and slidable thereon toward said obturator to check the concentricity of the obturator and the orifice.

6. A pressure regulating valve as defined in claim 3 in which said frictionless guide means comprises spaced sets of coplanar wires attached to said stem and extending radially therefrom, the wires of each set being spaced at equal angles from one another, each wire being attached to a fixed support at its radially outer end and being under tension.

7. A pressure regulating valve as defined in claim 6, including means for varying the tension in said wires.

PAUL ANGLES D'AURIAC.

References Cited in the file of this patent

UNITED STATES PATENTS

| Number | Name | Date |
|---|---|---|
| 720,375 | Nageldinger | Feb. 10, 1903 |
| 998,019 | London | July 18, 1911 |
| 1,849,475 | Bottoms | Mar. 15, 1932 |
| 1,878,749 | Abramson | Sept. 20, 1932 |
| 1,885,000 | Muller | Oct. 25, 1932 |
| 1,988,841 | Hayward | Jan. 22, 1935 |
| 2,175,460 | Guildford | Oct. 10, 1939 |
| 2,220,470 | Balsiger | Nov. 5, 1940 |